Feb. 16, 1932.  J. A. HINGER  1,844,935
CONTROL MECHANISM FOR PRESSES AND THE LIKE
Filed March 28, 1927  3 Sheets-Sheet 2
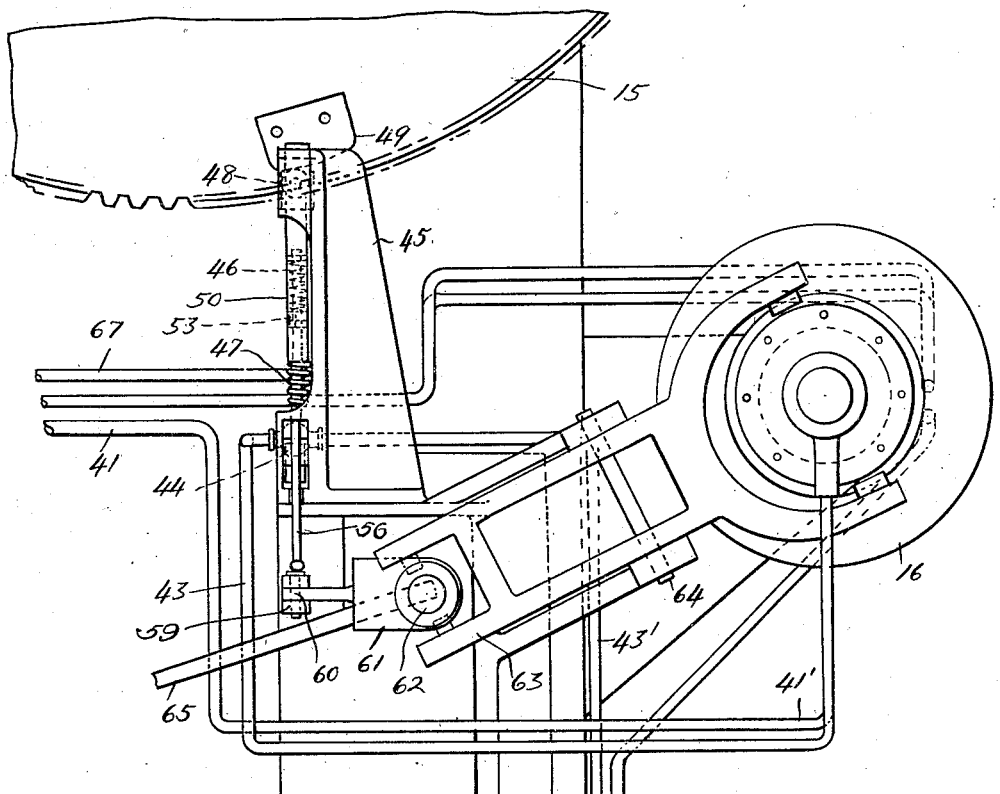
Fig. 2.
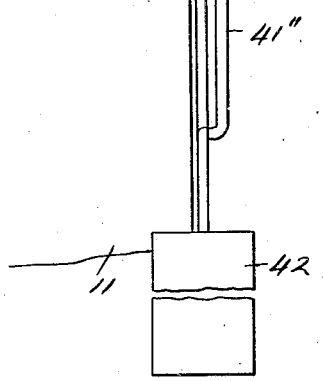
Inventor
John A. Hinger
By Whittemore Hulbert Whittemore
 + Belknap
Attorneys

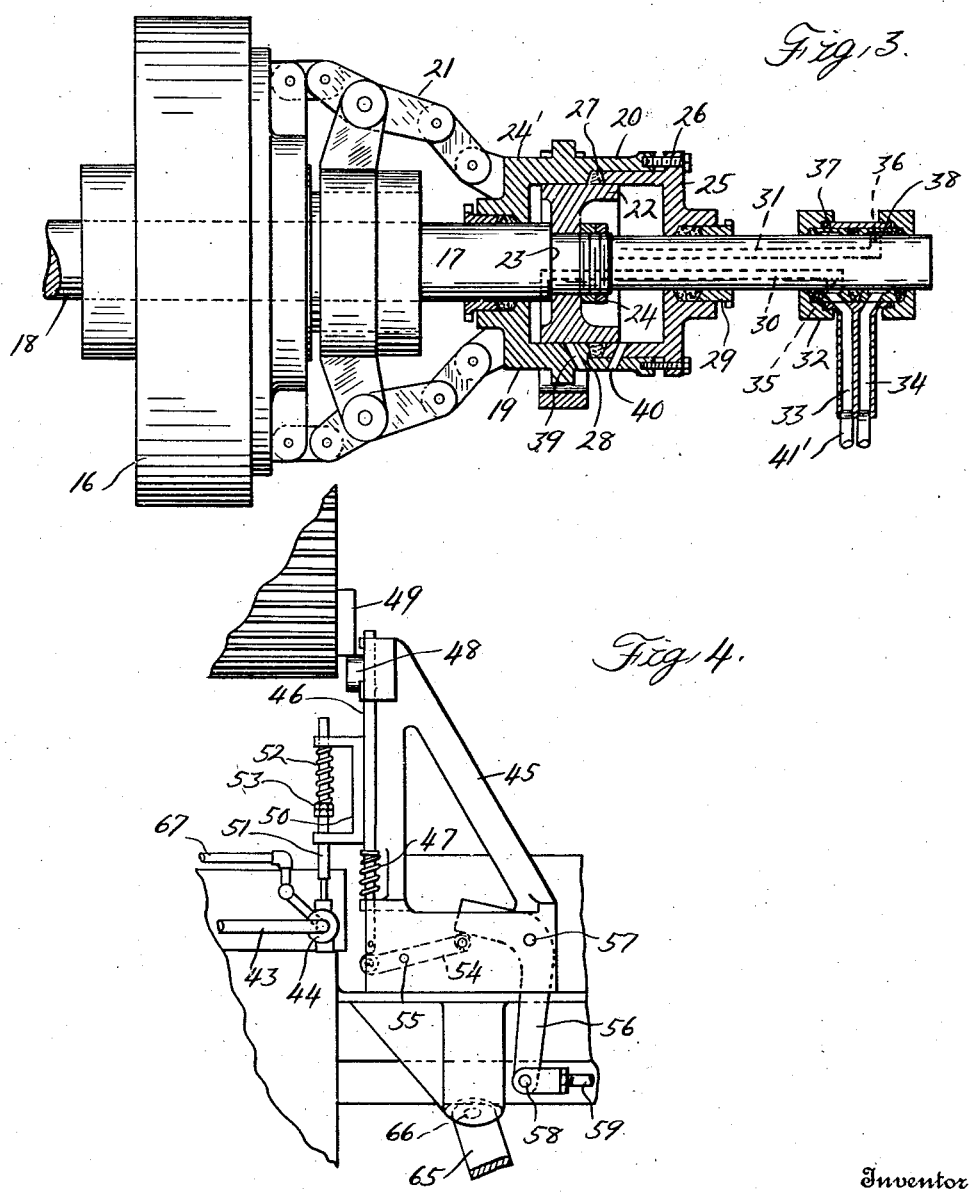

Patented Feb. 16, 1932

1,844,935

UNITED STATES PATENT OFFICE

JOHN A. HINGER, OF CLEVELAND, OHIO

CONTROL MECHANISM FOR PRESSES AND THE LIKE

Application filed March 28, 1927. Serial No. 179,116.

This invention relates to control mechanism for presses and the like and more particularly to a fluid pressure controlled clutch in combination with means for mechanically effecting the disengagement of the clutch.

The invention contemplates the use of a simple and compact fluid pressure controlled clutch operating mechanism which, in the embodiment of the invention hereinafter described in detail, includes manually operable valves for controlling the fluid pressure to effect the engagement of the clutch and an automatically controlled valve for effecting the disengagement of the clutch. For the purpose of positively insuring the disengagement of the clutch after each operation of the press, a mechanical knockout device is provided which, through a system of suitably connected levers effects the disengagement of the clutch upon failure of the fluid pressure to function.

The various objects, advantages and novel details of construction of one illustrative embodiment of the invention will be made more apparent as this description proceeds especially when considered in connection with the accompanying drawings wherein:

Figure 1 is a fragmentary elevational view of a press with my invention associated therewith.

Figure 2 is an end elevation of the structure illustrated in Figure 1.

Figure 3 is an enlarged sectional view through the clutch and the fluid pressure actuating mechanism therefor, and Figure 4 is an enlarged view showing the mechanical knock-out device more in detail.

Figure 1:
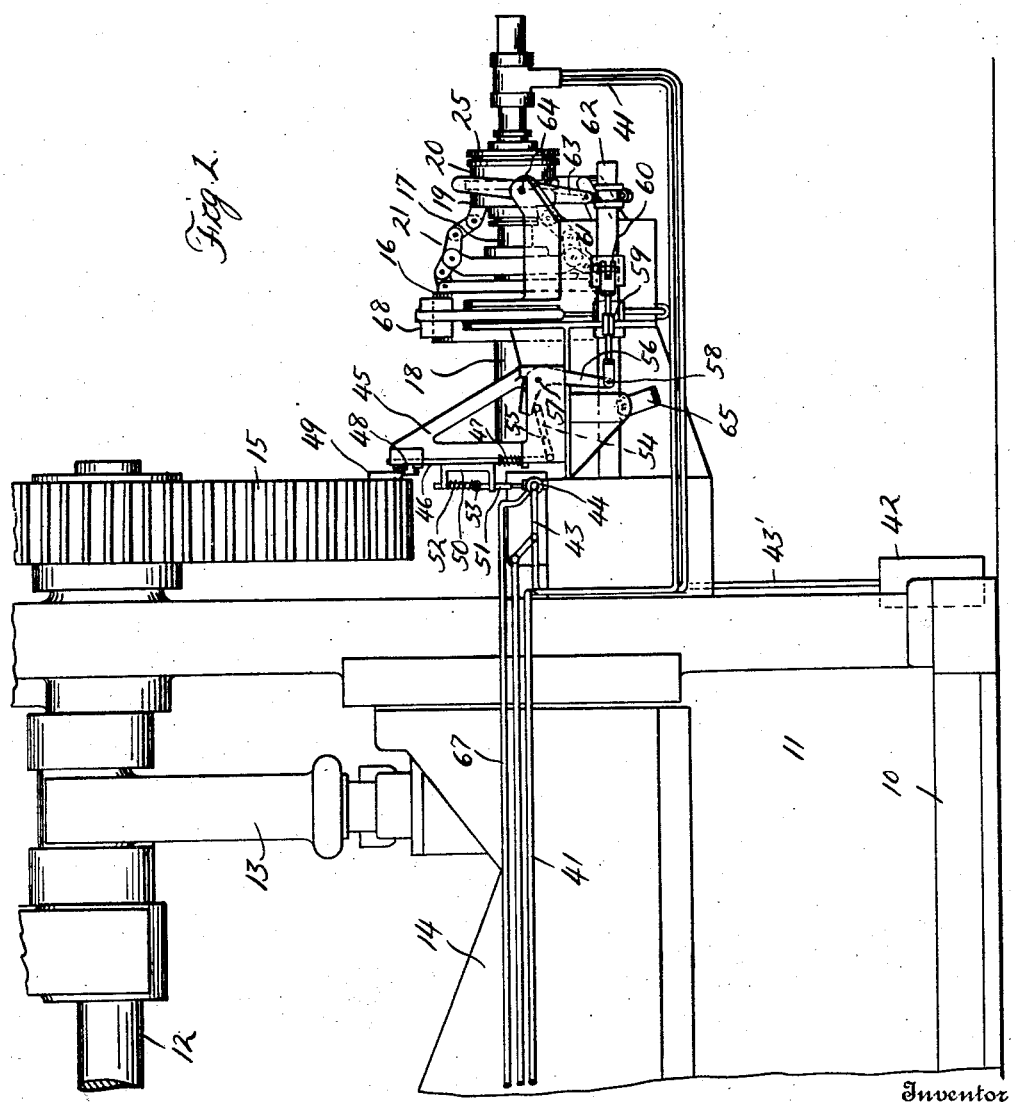

While throughout the following description and in the drawings, the invention is described and illustrated as employed in connection with a press, it will be immediately apparent that this is for illustrative purposes only and that the invention is applicable with equal utility to various types of power controlled mechanisms particularly where it is desirable to automatically stop the mechanism at the end of each operation or at other stated intervals.

In the drawings there is illustrated a press including a bolster plate 10, uprights 11 and a crankshaft 12 connected by connecting rods 13 to a ram 14. Keyed to the crank-shaft 12 is a driving gear 15. A clutch 16 is provided which is adapted to couple driving shaft 17 with driven shaft 18. This clutch is of any preferred or desired construction, the details of which form no part of this invention.

The clutch is normally operated by means of a fluid pressure controlled mechanism indicated generally by the reference character 19. This mechanism includes a movable cylinder 20 connected by a system of levers and links 21 to the movable element of the clutch. The cylinder 20 is reciprocable with respect to a piston 22 fixed to the shaft 17, for instance, by engagement on the one hand, against a shoulder 23 formed by reducing shaft 17 and held in place by nuts 24 threaded on to the reduced portion of this shaft. For the purpose of facilitating assembly the cylinder 20 is preferably formed in two sections 24' and 25, the open ends of which telescope one within the other as illustrated more clearly in Figure 3, these two cylinder sections being united by means of bolts 26. A ring of packing material 27 may be provided between the end of the inner telescoping member and a shoulder 28 formed in cylinder member 20 which packing material will act to prevent the escape of the fluid pressure from one side of the piston to the other. Stuffing boxes 29 are provided at both ends of the cylinder at the points of emergence of the shaft 17.

Fluid pressure is admitted to the cylinder 20 by means of ports 30 and 31 extending longitudinally of shaft 17 and communicating with cylinder 20 on opposite sides of piston 22. The air lines are coupled to the ports 30 and 31 by means of a fitting 32 provided with an air inlet passage 33 by means of which air is supplied to port 30 and thence to the cylinder for effecting the engagement of the clutch and with a passage 34 by means of which air is supplied to port 31 and thence to the cylinder for effecting the disengagement of the clutch. It will be noted that the ports 30 and 31 are each formed with radially extending portions 35 and 36 respectively which open on to the outer surface of shaft

17 and communicate with circumferential grooves 37 and 38 formed in the fitting 32 which grooves communicate respectively with the passages 33 and 34. Thus during the entire rotation of shaft 17 the air inlet passages 33 and 34 are constantly in communication with ports 30 and 31.

Exhaust ports 39 and 40 are formed in the wall of cylinder 20 and are controlled by the piston 22 upon reciprocation of the cylinder. It will be obvious that with the ports in the position illustrated in Figure 3, exhaust port 39 is closed so that air or other fluid pressure may be introduced through port 30 to the end of the cylinder nearest the clutch whereupon the cylinder will move in the direction of arrow A to effect an engagement of the clutch. At the end of its stroke, port 39 will be uncovered to exhaust the air from this end of the cylinder and port 40 will be covered by the piston whereupon air may be introduced into the other end of the cylinder through port 31 to move the cylinder 20 in a direction opposite that indicated by the arrow A to thus effect the disengagement of the clutch.

In some instances and particularly when the present invention is used in connection with presses it is found desirable and expedient to control the engagement of the clutch by manually operated valves arranged in an air line 41 which preferably extends entirely around the press with the valves located at their front and rear sides thereof so as to be operable by persons standing at the front and rear of the press. Thus one end of this air line indicated by the reference character 41' will be connected to the inlet passage 33 of fitting 32 whereupon this air line will be extended around the press and the other end 41" connected to an air supply chamber 42. The air release line 43 extends from one side of control valve 44 to the inlet passage 34 of fitting 32 and has a branch 43' extending from the other side of air control valve 44 to the air cylinder 42.

In order to automatically operate control valve 44 I provide a mechanism which includes a bracket 45 mounted preferably in an upright position as illustrated, which bracket slidably supports a rod 46 normally held in its upper position by means of a spring 47. A roller 48 carried by the upper end of rod 46 is adapted to be engaged by a cam 49 carried by rotatable gear wheel 15. A bracket 50 secured to rod 46 engages with its ends a valve operating rod 51, these parts being resiliently connected by passing the rod 51 slidably through aligned apertures in the bracket and interposing a spring 52 which surrounds the rod 51 and bears on the one hand against one of the bracket arms and on the other hand against nuts 53 threaded on the said rod. As a consequence of this construction a downward movement of rod 46 resulting from an engagement of cam 49 with roller 48 causes the bracket 50 to impart a similar movement to rod 51 to thus operate valve 44 to permit air or other fluid pressure to pass from the air supply chamber 42 through branch air line 43' and thence through air line 43 to the inlet passage 34 of fitting 32. This will let air into the right hand end of cylinder 20 to thus move the cylinder toward the right to effect a disengagement of the clutch.

In order to effect the positive disengagement of the clutch at the end of each operation of the clutch, irrespective of whether or not the fluid pressure control functions, I have provided a mechanical operating mechanism for the clutch which is positively operated each time the cam 49 engages cam roller 48. This mechanism includes a lever 54 pivotally mounted as at 55 to the lower part of bracket 45, one end of the lever being engaged by the lower end of rod 46 and the other end engaging the short end of a bellcrank lever 56 pivotally mounted as at 57 on the bracket 45. The other end of this bellcrank lever is connected as at 58 to the end of an adjustable link 59 pivotally connected as at 60 to a collar 61 which engages a shifter shaft 62. Movement of the shifter shaft 62 is transmitted by means of a yoke 63 pivotally mounted as at 64 to cylinder 20. As a consequence of this construction a downward movement of rod 46 resulting from an engagement of cam 49 with roller 48 causes an oscillation of lever 54 and an upward movement of the right hand end of this lever which rocks bell crank lever 56 to move link 59 toward the left thus causing a corresponding movement of shifter shaft 62. This movement of the shifter shaft rocks yoke 63 about its pivot 64 and causes a movement of cylinder 20 toward the right thus effecting a disengagement of the clutch.

A hand operated lever 65 may be pivotally mounted as at 66 and connected to shifter shaft 62 so as to manually operate the clutch when desired, in a manner apparent without further description.

An emergency air line 67 may be provided which extends to points adjacent the front and rear of the press and provided with manually controlled valves (not shown) and connected to the air release line on both sides of the valve 44 whereby, should an emergency arise, by a manual operation of suitable valves, air may be passed from the branch air line 43' to clutch release air line 43 to effect a disengagement of the clutch at any point during the cycle of operations.

As previously mentioned the particular construction of the clutch employed is of little consequence but as is customary with mechanisms of this character the clutch will preferably be provided with the usual brake 68, operated generally by the shifter rod 62 upon a disengagement of the clutch.

While a further description of the operation of the herein described apparatus is believed to be unnecessary in view of the foregoing, it should be understood that means is provided for effecting the engagement and disengagement of the clutch by fluid pressure and that the disengagement is controlled automatically by a moving part of the press so that the clutch is disengaged for instance, at the end of each operation. Additional means is also provided for insuring the positive disengagement of the clutch at the end of such periods by a mechanical connection between a moving part of the press and the clutch operating cylinder. Furthermore the invention contemplates a simple, efficient and compact design of clutch operating mechanism wherein a reciprocable cylinder and stationary piston are provided with means for constantly maintaining the connections between the air lines and both sides of the cylinder and means for automatically controlling the exhaust from both sides of the cylinder.

While one embodiment of the invention has been described herein somewhat in detail, it will be readily apparent to those skilled in this art that changes may be made in many of the essential and all of the non-essential details without departing from the spirit and scope of this invention and to this end reservation is made to make such changes as may come within the purview of the accompanying claims.

What I claim as my invention is:—

1. In a control mechanism for power operated machinery, the combination with a clutch, fluid pressure means for operating said clutch, and means controlling said fluid pressure to effect the engagement of said clutch, of automatically operable means for disengaging said clutch independently of the actuation of said fluid pressure means.

2. In a clutch controlled power operated device, the combination with a fluid pressure actuated clutch, of cam actuated means operated by said device for controlling the fluid pressure to said clutch and for additionally mechanically moving said clutch to disengaged position.

3. In a power press or the like, a rotating part, a cam carried by said part, a clutch, an air cylinder for operating said clutch, a clutch release air line and a valve controlling the same, means actuated by said cam for operating said valve and means connected to said last means for mechanically releasing said clutch.

4. In a power press or the like, a rotating part, a cam carried by said part, a clutch, an air cylinder for operating said clutch, a clutch release air line and a valve controlling the same, a rod reciprocable by said cam, means connecting said rod to said valve for operating the latter and means operated by said rod for mechanically releasing said clutch.

5. In a power press, a clutch, fluid pressure actuated means for disengaging said clutch, mechanical means for disengaging said clutch, and a movable member controlled by the actuation of the said press for actuating said fluid control means and said mechanical means.

6. In a power press or the like, a rotating part, a cam carried by said part, a clutch for coupling said rotating part to a source of power, a movable member for actuating said clutch, a valve for controlling the flow of a fluid under pressure to said movable member to control the actuation of the same, a yoke for actuating said movable member, a lever for actuating said yoke, and means actuated by said cam upon a rotation of said rotating part for actuating said valve and said lever.

7. In a power press or the like, a rotating part, a cam carried by said part, a clutch for coupling said rotating part to a source of power, a movable member for actuating said clutch, a valve for controlling the flow of a fluid under pressure to said movable member to control the actuation of the same, a yoke for actuating said movable member, a lever for actuating said yoke, and means actuated by said cam upon a rotation of said rotating part for actuating said valve and said lever, said means including a rod engageable with said lever, a roller carried by said rod and engageable with said cam, and a second rod yieldably carried by said first mentioned rod for actuating said valve.

In testimony whereof I affix my signature.

JOHN A. HINGER.